United States Patent
Colson et al.

(10) Patent No.: US 7,461,151 B2
(45) Date of Patent: Dec. 2, 2008

(54) SYSTEM AND METHOD ENABLING FUTURE MESSAGING DIRECTIVES BASED ON PAST PARTICIPATION VIA A HISTORY MONITOR

(75) Inventors: James C. Colson, Austin, TX (US); Brian Lee White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 10/713,740

(22) Filed: Nov. 13, 2003

(65) Prior Publication Data

US 2005/0108402 A1 May 19, 2005

(51) Int. Cl.
*G06F 15/16* (2006.01)
(52) U.S. Cl. ........................ 709/227; 709/206; 709/207
(58) Field of Classification Search .................. None
See application file for complete search history.

(56) References Cited

U.S. PATENT DOCUMENTS

| | | | | | |
|---|---|---|---|---|---|
| 5,589,873 | A | | 12/1996 | Natori et al. ............. 348/14.09 |
| 5,905,863 | A | * | 5/1999 | Knowles et al. ............. 709/206 |
| 5,937,161 | A | * | 8/1999 | Mulligan et al. ............. 709/206 |
| 6,002,768 | A | | 12/1999 | Albanese et al. ............. 713/175 |
| 6,044,205 | A | * | 3/2000 | Reed et al. ................. 709/201 |
| 6,108,028 | A | | 8/2000 | Skarbo .................... 348/14.03 |
| 6,134,582 | A | * | 10/2000 | Kennedy ................... 709/206 |
| 6,216,122 | B1 | | 4/2001 | Elson ........................... 707/3 |
| 6,347,339 | B1 | | 2/2002 | Morris et al. ............... 709/237 |
| 6,496,201 | B1 | | 12/2002 | Baldwin ..................... 345/753 |
| 6,718,368 | B1 | * | 4/2004 | Ayyadurai .................. 709/206 |
| 6,785,710 | B2 | * | 8/2004 | Kikinis ....................... 709/206 |
| 6,963,904 | B2 | * | 11/2005 | Yong .......................... 709/207 |
| 7,089,287 | B2 | * | 8/2006 | Bellotti et al. ............. 709/206 |
| 7,130,885 | B2 | * | 10/2006 | Chandra et al. ............ 709/206 |
| 2003/0163538 | A1 | * | 8/2003 | Yeh et al. .................... 709/206 |

OTHER PUBLICATIONS

International Business Machines Research Disclosure #444615, "Application Service Portal for Multi-Company, Multi-Service Offerings", pp. 658 and 659, Apr. 2001.

* cited by examiner

*Primary Examiner*—John B. Walsh
(74) *Attorney, Agent, or Firm*—Robert H. Frantz; Diana R. Gerhardt (57) ABSTRACT

A system and method for controlling the flow of documents by associating Globally Unique Identifiers with each original document, each reply document, each copy document and each forwarded document, such as e-mail messages. Historical analysis is performed on a locally stored history records containing the Globally Unique Identifiers extracted from received documents to determine which recipients are active participants and which are inactive participants, according to user preferences and thresholds. Lists for direct recipients (e.g. "To" list), carbon copy recipients, and blind copy recipients are automatically proposed to a user of a document handling system when authoring a new document, replying to a document, or forwarding a document, according to the results of the historical participation analysis, thereby stemming information flow to participants who are not active in an ad hoc asynchronous conversation.

30 Claims, 9 Drawing Sheets

SYSTEM AND METHOD ENABLING FUTURE MESSAGING DIRECTIVES BASED ON PAST PARTICIPATION VIA A HISTORY MONITOR

BACKGROUND OF THE INVENTION

1. Field of the Invention

This invention relates to asynchronous communications schemes which allow for automated recipient list management, such as electronic mail ("email"), chat, document conferencing and text messaging systems.

2. Background of the Invention

Figure 1:
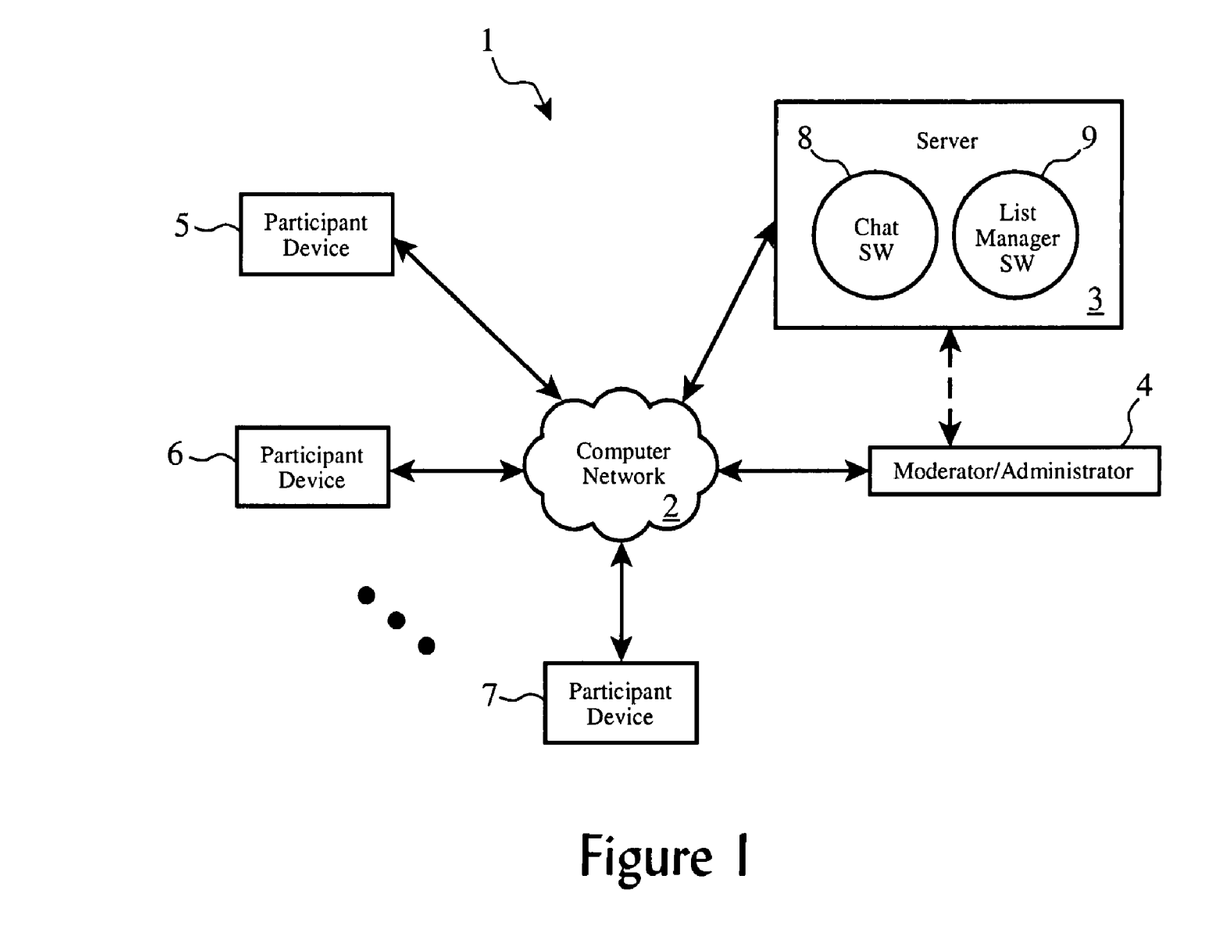
FIG. 1 shows a general arrangement of communications terminals such as email clients or web browsers, in relationship to a server, computer network, and administrator console.

Chat rooms, news groups and list servers are well-known forms of multi-participant communications. As shown in FIG. 1, the topology (1) of the systems employed for such communications typically includes a computer network (2) such as the Internet, an intranet, a wireless network, or combinations of networks. A Server (3) is usually arranged with access to the computer network (2), and is provided with appropriate chat room application software (8) or email list manager software (9). A moderator or administrator (4) console may be directly connected or incorporated to the Server (3), or may remotely control the Server through the computer network (2).

Through various configuration and permission actions, multiple participants (5, 6, 7) are enabled to communication with each other through the Server (3). Communications are generally one-to-many, in which one participant creates an original message or a reply message, submits it to the Server, and it is disseminated to multiple participants according to permission, rules, and distribution lists. In certain "moderated" groups, the submitted message may require review and approval of the administrator before it is forwarded to the other participants.

This type of communications is primarily asynchronous in nature, but may be more or less "real time". For example, America Online's Instant Messenger™ product is a variety of such a communication system which allows for "instant" or real time discovery of specially designated participants' (e.g. "buddies") online status, and real time delivery of messages to them. In other systems, though, a participant may have to initiate a download or update of messages being held for him or her, such as an email list server system.

While traditionally the servers have been highly specialized computing platforms, and the participant devices have been personal computers ("PC"), more recently, smaller and more mobile devices have become capable of interfacing to these communications systems. These include personal digital assistants ("PDA") with appropriate network interfaces, web-enabled and short messaging service ("SMS") compatible cellular telephones, pocket PC's, television "set top" devices (e.g. WebTV, DSS satellite receivers, etc.), and two-way paging devices. As more and more devices become "web enabled", it is reasonable to anticipate a much wider variety of participant devices such as automobile dashboard systems.

Figure 2:
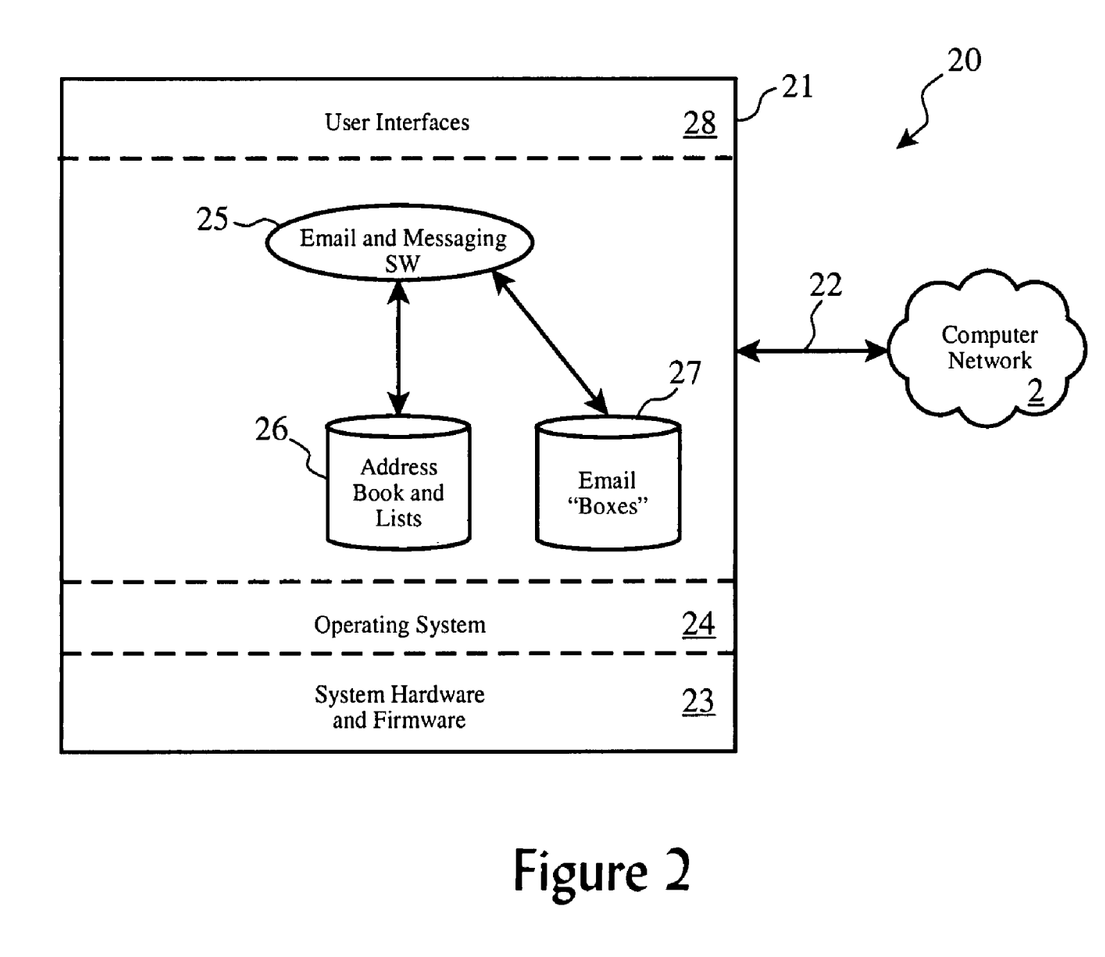
FIG. 2 provides a more detailed perspective of such a communications terminal.

Also well-known in the art are common email client devices, such as that shown in FIG. 2. In this arrangement, a device (21) such as a PC, PDA, PCS phone, etc., is interconnected (22) to a computer network (2) such as the Internet, an intranet, a wireless network, or a proprietary network. The interconnection may include use of a physical link such as a dial-up modem, Digital Subscriber Line ("DSL"), cable modem, Ethernet, wireless data link, etc., as well as one or more protocols, such as Simple Mail Transfer Protocol ("SMTP"), Point-to-Point protocol ("PPP"), etc.

The device (21) typically is equipped with one or more user interface devices such as a keyboard, mouse, trackball, touch-screen, microphone, speaker, display, etc., and the necessary hardware and firmware to execute messaging software. The hardware usually includes a microprocessor, memory, battery, etc., along with necessary control and embedded firmware. An operating system such as Linux, Microsoft Windows™, Palm Computing's PalmOS™, or similar software is often included to facilitate the addition of application programs to the device.

An email or message software application program (25) such as AOL's Instant Messenger, Lotus Notes, Netscape Navigator, or Microsoft Outlook is provided to author, send, retrieve and read messages such as email, text pager messages, SMS messages, etc.

The email or message program (25) usually has one or more message "boxes (27) where received messages are stored, and an address book (26) where known recipients' information is stored. A user can recall one or more addressees from the address book when authoring a new message, and can easily add entries directly from a received message (e.g. a "return address") to the address book. Most address books also allow for inclusion of each entry into one or more "lists" or "groups", such as "family" or "soccer parents". This common feature allows a user to designate multiple recipients of a message with one selection of a group or list name.

Further, most of these common messaging programs allow a user to automatically address a reply message to the sender, or to address the reply to all of the other recipients of the original message as well as the originator (e.g. a "Reply to All") function.

Using the "Reply to All" with or without an address book list, a user may create a virtual email list without the need for a list server or moderator, as previously described. This type of ad hoc email list and discussion group formation is very common, and often instigated without intending to start such a group discussion.

For example, consider the following email "flow". Assume there are a number of participants, where some participants are actively engaged in the conversation by contributing content and information to the flow, while others are carbon copy ("CC") observers. Some participants may have been initially CC observers when the flow started (e.g. when a new thread or subject is started), while other participants may have been addressed directly at the beginning and have continued participation in the same group, and others have "widened" the group. This type of email flow is well understood as being modeled as a tree with numerous branches.

Figure 3:
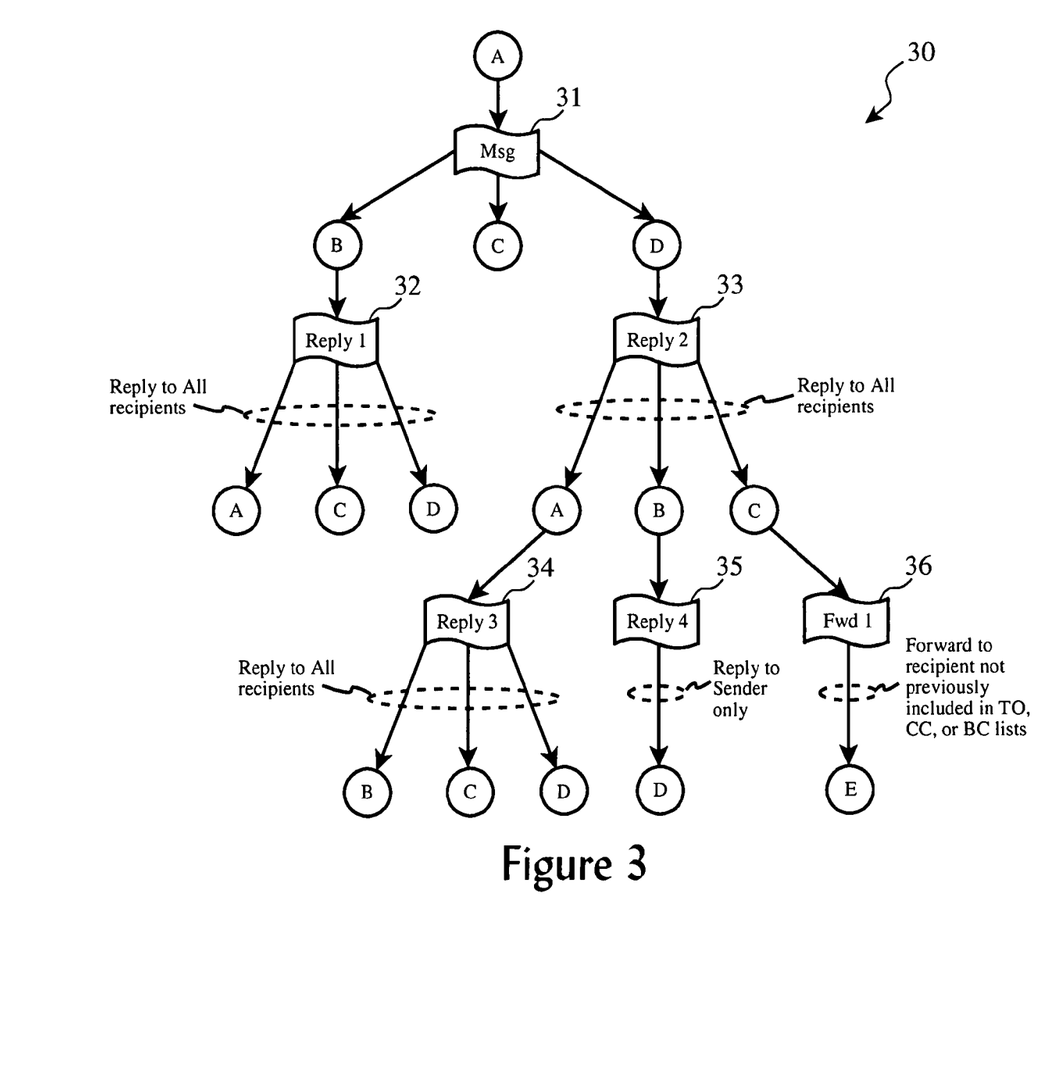
FIG. 3 illustrates the flow of messages which constitute an ad hoc conversation.

FIG. 3 illustrates a relatively small, four-member flow, starting with member-A creating a message (31) addressed to members B, C, and D. Member-B can easily author and send a reply message (32) to all the addressees of the original message (e.g. A, C, and D). Assume also that member-D sends a reply (33) to all original addressees, too. This type of a reply to the entire virtual group can be called a "reply to everyone-wide".

In the next exchange of messages, member-A replies (34) to everyone in response to member-D's reply (33), but member-B only replies (35) back to member-D (e.g. a reply to sender only operation). Member-C, who has previously been an inactive observer, now forwards (36) the reply (33) from member-D to a new member-E, with or without comments.

In another variation of these replies, a user can first select "Reply to Everyone", which automatically enters all of the recipients of the predecessor message into the "To" field of the reply message.

Using such automatic reply addressing functions, the "tree" of messages can quickly expand to many members and many messages, as has been experienced by almost all users of normal email. Some recipients never reply or forward, while others may reply and forward in response to every message. These characteristics define the extremes of "observer" and "active participant". Further, a particular participant may change characteristic over time, perhaps initially being an observer and becoming more active several messages into the tree.

As this type of communications arrangement is not controlled or managed by a central server, there are no useful tools for regulating or metering the flow of such messages. Users who wish to create and respond to such messages must rely upon the simple addressing and filtering tools provided by ordinary email programs.

Therefore, there is a need in the art for a tool that, subsequent to initiating a flow, assists a user in making intelligent decisions on how to propagate that flow. For instance, a tool which allows a user to easily determine the list of "active" members for any or all branches of the conversation, or to easily determine the list of passive members for any or all branches, etc.

Further, there is a need in the art for this new tool to allow participants in email systems and more generally any messaging based system to operate more efficiently through intelligent prioritization of email inbox contents, coalescence of classes of participants across branches, narrowing addressee lists based on activity levels, and the like.

BRIEF DESCRIPTION OF THE DRAWINGS

Preferred embodiments of the present invention will now be described by way of example, with reference to the accompany drawings.

SUMMARY OF THE INVENTION

As messages, documents or contributions to a conference are authored and sent to other participants, such as by "Replying", "Forwarding", or "Replying to All", the number of recipients and participants often increases significantly, nearly exponentially in many cases. The present invention is applicable to email-based conversation processes, as well as other types of asynchronous communication methods such as Short Messaging Service, and persistent document collaborative editing (e.g. "document conferencing"). As such, we refer in this description to a "document" as being any electronic resource which can be exchanged or forwarded from one user to another.

For example, in an email system, each original message is a document, and each reply message is another document. Similarly, each forwarded message is a document. Any email message which attaches or includes a previous message can be viewed as attaching or including the previous document, as well.

The disclosed method and system provides previously unavailable control in the decisions about how to propagate the flow of document at each point of propagation, e.g. at each time a user decides to reply to or forward an email message, such that the recipient lists are limited only to actively participating recipients based upon participation analysis.

This approach avoids the need for a centralized server to manage a mailing list, or a moderator to screen messages and reflecting scheme, while allowing some intelligent fettering of flow of documents in a distributed manner (e.g. distributed among the participants' computers).

As such, according to the present invention, Globally Unique Identifiers ("GUID") are recorded in each document authored, replied to, or forwarded, in a set of metadata which records certain historical information regarding the message or document. This metadata is extracted from each received document, and stored in a user's local persistent media.

Subsequently, each time a user is ready to reply to a message or received document, or to forward a message or document, an analysis is performed on the historical participation level of each potential addressee using these GUIDs and the lists of recipients and authors to reconstruct and traverse a tree structure of the history of related documents.

It is determined which recipients and authors have participated or contributed to the information flow, and which have simply observed the information flow, as defined by one or more user preferences.

The participation levels of each potential addressee are compared to a set of user preferences, and an addressee list is proposed to the user including only those potential addressees which meet the user's criteria for further inclusion in the conversation.

When ready to reply or forward a new document such as an email reply or email forward message, a user can automatically address the new document to only those participants who he or she consider to be "active" participants, thereby eliminating flow of the message to inactive or passive members and reducing the number of future branches of the tree which will be created. Alternatively, the user may include recipients who have been dropped from the distribution of more recent messages, but who historically contributed prior to being dropped from distribution.

Several methods of participation analysis are disclosed, including an architecture which is extendable to include other methods of analysis. At each propagation point in the flow of document, active and passive members of the conversation are determined, based upon each recipient's individual analysis preferences and criteria.

This allows participants in such communication processes to operate more efficiently through more intelligent prioritization of e-mail boxes, easily coalescing classes of participants across branches, narrowing address lists based on the activity level, while avoiding the technical and operational complexities and limitations encountered with traditional chat group servers and mail list servers.

DETAILED DESCRIPTION OF THE INVENTION

Typical documents exchanged via systems such as email servers and clients include a number of parameters in each document, including an author designation such as an author's name and address, at least one recipient designation(s), and optionally one or more carbon copy ("CC") and/or blind copy recipients. Exchanged documents such as these typically include a time and date stamp for when a message was created, transmitted, or forwarded. Further, they may include certain conventional text strings in a subject field which indicate that they are forwarded messages (e.g. "Fwd:") or reply messages (e.g. "Re:").

In order to determine the historical participation of other addressees in an ad hoc conversation, several problems arise. First, there is no consistency between different document handling programs as to the use of special text strings in the subject field to indicate whether or not a message is an original message (e.g. a first message in a series of messages), a forwarded message, or a reply message.

Second, many document exchange processes, such as Simple Mail Transfer Protocol ("SMTP") email message systems, depend on the client devices to provide a time and date indicator as to the time of transmission or origin of each document. As these different client clocks often are not synchronized in many scenarios such as a group of personal computers interconnected to the Internet, message time stamps are not a reliable basis upon which messages can be sorted and ordered into a historical tree.

To solve the first problem, the subject line is not required as a primary piece of information by the present invention, thus allowing the invention to avoid dependencies on which application program or client is used to author a message. To solve the second problem, each document handling program or messaging client is enhanced to include the mechanisms and processes described in the following paragraphs. The method of enhancing or extending the functionality of an existing document handling program may include direct software code changes (e.g. inline changes), use of a dynamically linked library ("DLL"), use of a "plug-in", or any other suitable means.

Document Genealogical Metadata With GUIDs

The present invention provides that each document in a flow of asynchronously exchanged documents is assigned a new Globally Unique Identifier ("GUID") at the time the message is originally created. Additionally, documents authored in reply (e.g. reply messages) to an original message, and documents which represent a forwarded version of an original message, are also assigned a GUID.

A GUID is a value, number or string which is guaranteed to be unique. Techniques for generating GUID values are known in the art, and include, but are not limited to, using a unique network address (e.g. a MAC address) of a source or authoring document handling client, combined with a value such as a time stamp, random number or document serial number.

The GUID values are preferably stored within a set of genealogical metadata parameters included in or associated with each exchanged document. These parameters record the document GUID and participant identifier of the origin or source of the tree of conversation, as well as GUIDs for the immediate parent or predecessor document, in addition to the traditional indicators of recipients and author of each document. For example, in an email embodiment of the present invention, the header of each message is enhanced to include a document GUID, a parent document GUID, and original document GUID, as well as to contain the traditional email addresses or user names provided in a TO list, a CC list, a BC list, and a FROM field, such as the example genealogical meta data preferably contains at least the information shown in Table 1.

TABLE 1

Example Meta Data Information in Each Message

| Data Item | Describes |
|---|---|
| SelfGUID | A GUID for the current document |
| ParentGUID | The GUID for the immediate predecessor document to the current document |
| OriginGUID | The GUID for the origin document to the current document |
| TOlist | List of recipients or contributors to which the current document is directed |
| CClist | "Carbon Copy" List of recipients, observers or reviewers to which copies of the current document are directed |
| BClist | "Blind Copy" List of recipients, observers or reviewers to which copies of the current document are directed but whose identity is not shown to other recipients, observers and reviewers |
| FROMfield | an indicator of the author or sender of the current document |

Using a genealogical metadata set such as this, when a message is received, the receiving client can extract the metadata to determine the following information:
  (a) what document, by GUID, is the "root" or beginning of the conversation tree to which this message belongs (e.g. the Origin), including the identifier of the author of the original document;
  (b) what document, by GUID, is the immediate parent or predecessor of the current message, including the identifier of the participant who forwarded or replied to the original document; and
  (c) what other participants received the same document as indicated by the addressees in the TOlist, CClist, and BClist.

By using the document GUIDs, each document is uniquely identified and can then be placed in its proper position in a tree of messages relative to other messages in the same conversation.

Document Exchange—Example Flow

Figure 8:
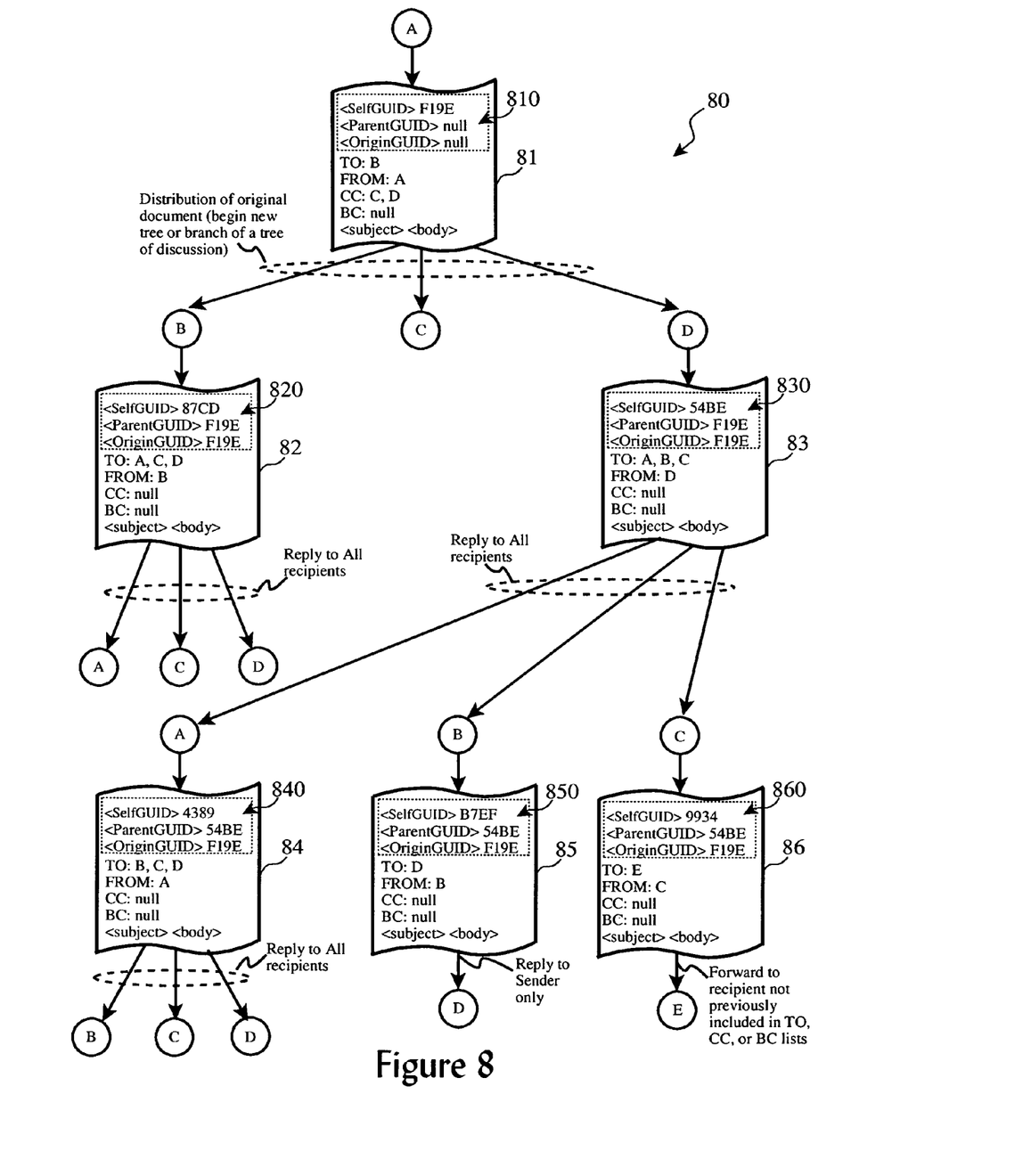
FIG. 8 illustrates a document flow in which the documents employ the present invention.

The example flow as described in conjunction with FIG. 3 is revisited in the example flow (80) of FIG. 8, albeit incorporating the genealogical metadata into the documents in this example.

A "top of tree" document (81) is initially authored by member-A. This document contains the traditional TOlist, FROMfield, CClist, and BCList, subject line and body, but also includes our genealogical metadata (810). In this example, this original document includes a SelfGUID value of "F19E" as well as a OriginGUID of "F19E", and a null value for its ParentGUID as it has no actual predecessor document. Alternatively, in this "top of tree" situation, the ParentGUID could be set to equal the SelfGUID or OriginGUID. As the TOlist and CClist indicate, this original document (81) is distributed or transmitted to member-B, member-C and member-D, each of whom receive a copy of the same document.

In this scenario, member-B then authors a reply document (82), which is assigned a SelfGUID of "87CD" in its genealogical metadata (820). Also, this document is assigned a ParentGUID of "F19E", which is the GUID of the predecessor document received from member-A. The OriginGUID of this reply document (820) is also set to "F19E". This document is then sent to all of the recipients of the predecessor document (e.g. Reply-To-All), member-A, member-C, and member-D.

When member-D receives the original document (81), he or she decides also to "Reply to all", which generates another new reply document (83) having genealogical metadata (830) of a new SelfGUID value "54BE", and the ParentGUID and OriginGUID values of "F19E". As with the other reply document (82), the ParentGUID shows that this new document (83) is immediately descended from the original document, and further shows that it is a sibling to member-B's reply document (82) (e.g. because the parent GUID's are the same value).

FIG. 8 illustrates a second descendant level of documents (84, 85, and 86) as created by the recipients of member-D's reply document (83). Each of these second level documents also includes genealogical metadata (840, 850, 860, respectively) associated with it, in which the OriginGUID is set to "F19E" reflecting the fact that they are descended from the origin document, and a ParentGUID value of "54BE" reflecting the fact that they are directly descended from member-D's initial reply document (83). Given this information in the metadata fields, it can also be determined that these three documents (84, 85, and 86) are niece/nephew documents of member-B's initial reply document (82), as their OriginGUID is equal to the uncle/aunt document's (82) ParentGUID. So, it can be seen that they all belong to the same "tree" starting with the top-most document (81), but belong to separate "branches" or sub-trees which were bifurcated at some point above member-D's contribution to the conversation (83).

Figure 9:
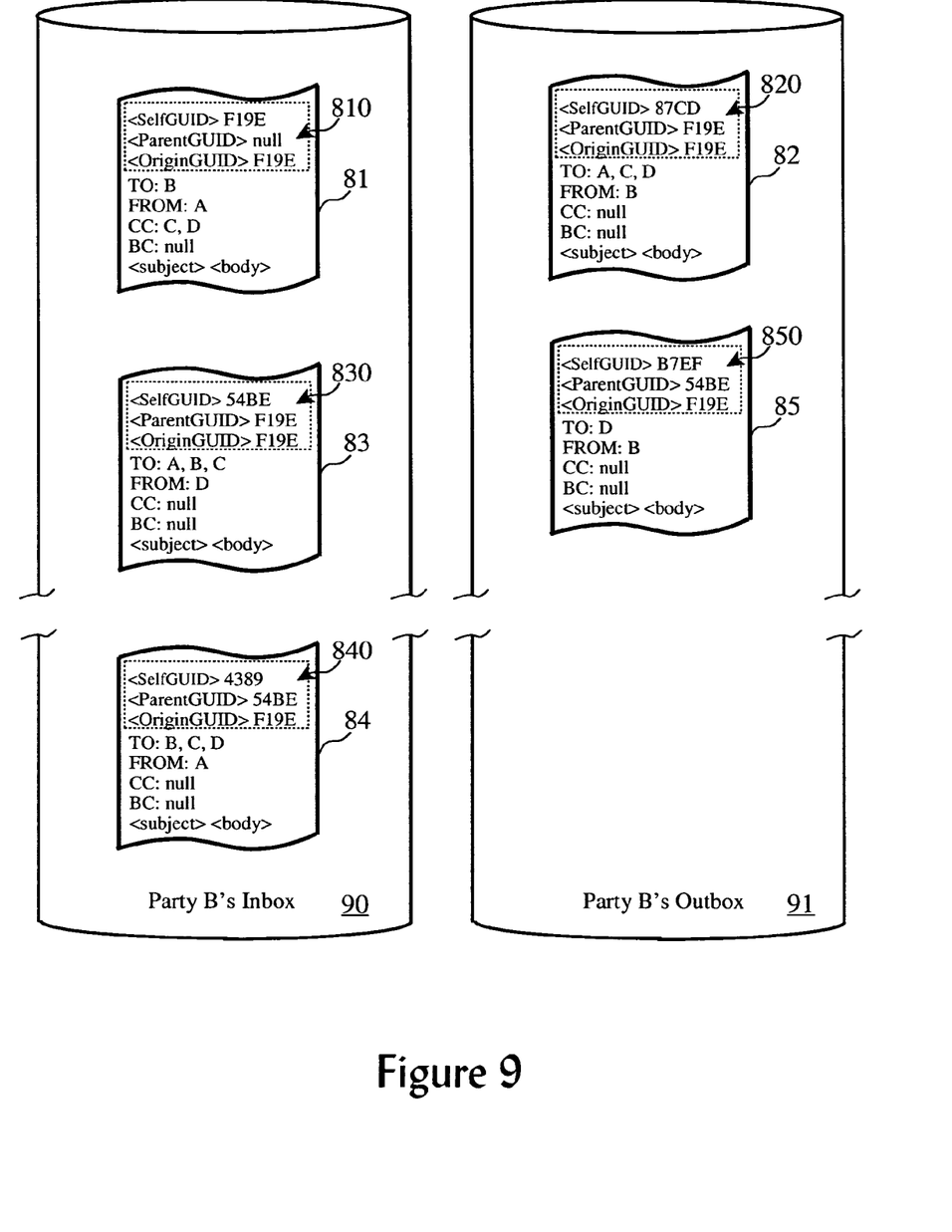
FIG. 9 shows the mailbox contents of one member of the document flow of FIG. 8.

Now, consider the collection of documents in member-B's inbox (90) and outbox (91), as shown in FIG. 9. In this case, of course the tree-like structure is unknown, but the messages themselves retain the genealogical metadata. Using this information, it can be determined which documents in the inbox and outbox are related, and how they are related. Further, by examining sets of related documents stored within the inbox and outbox as wells as their FROMfield, TOList, CCList, and BCList, it can be determined which participants actually contributed to the flow of information (e.g. are shown in a FROMfield), received information (e.g. shown in a TOlist, CClist, or BClist), and simply observed without contributing (e.g. shown in a TOlist, CClist, or BClist but never in a FROMfield). Further, by considering date and time stamps in these messages (not shown), it can be determine who recently provided a contribution, and who recently was dropped from distribution, etc.

Generating an Original Document (Top of Tree)

Figure 4:
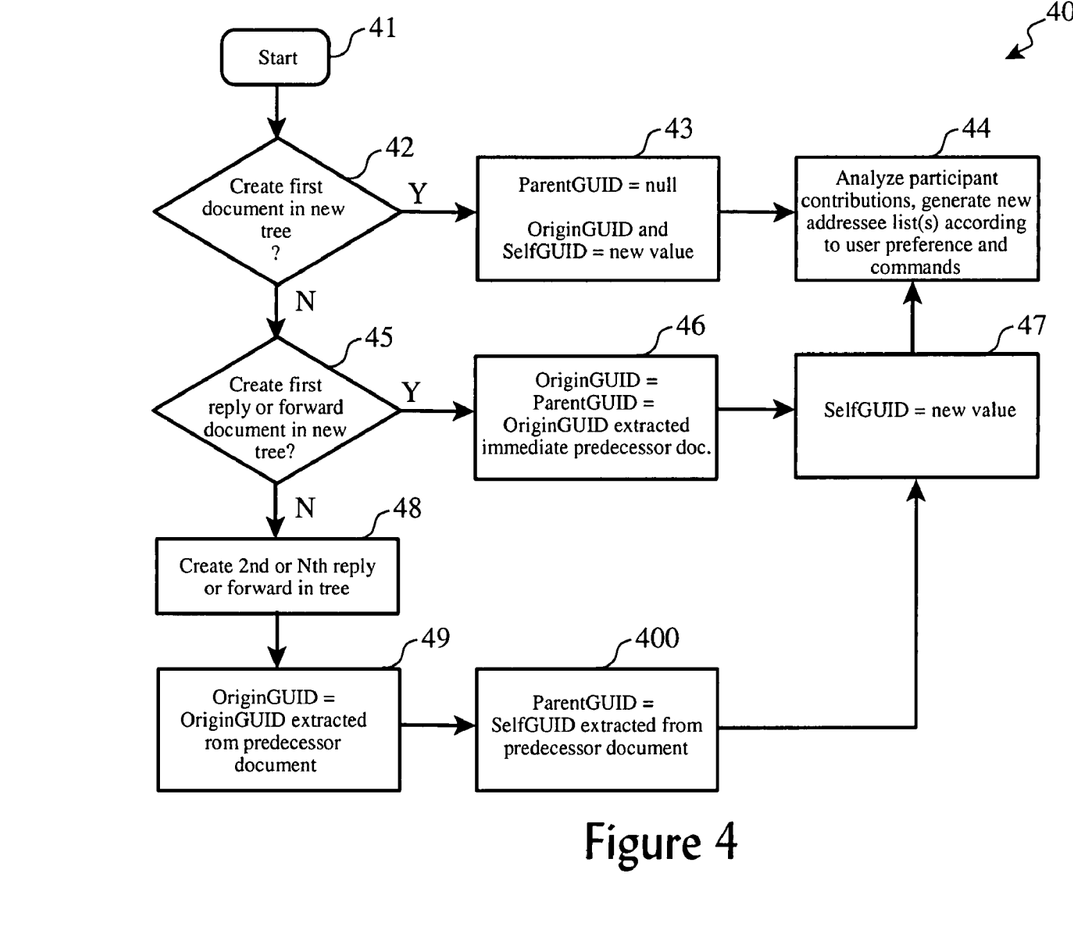
FIG. 4 shows our logical process of generating and managing GUID values in messages.

Turning to FIG. 4 which shows the logical process (40) according to the present invention for generating GUID meta data values and addressee lists, when (42) a document is being authored on a new subject (e.g. without previous discussion or historical context), the Self GUID is set to a new and unique value, and the Origin GUID and ParentGUID are preferably set to null (43). Alternatively, the OriginGUID and ParentGUID may be set to equal the SelfGUID.

Analysis is then optionally performed on the historical participation and contribution of a set of potential recipients, and proposed recipient lists (e.g. TO, CC, and BC lists) are generated (44) for the user's review, acceptance, or modification.

When this document is received by a recipient, these metadata values are be extracted and stored by the receiving document handling client. During subsequent analysis of these metadata values, it is detected that the ParentGUID value is equal to null (alternatively, is equal to the SelfGUID and/or the OriginGUID), which indicates that this message represents the beginning of a new conversation (e.g. the top of a new tree), or an "original message".

As such, according to our preferred embodiment, a document author can indicate the starting of a new tree (e.g. a new conversation) by explicit operation of a user control, or by the system detecting the user composing a message "from scratch" and entering a new subject field value for that message. Other user-defined methods may be employed to start new trees, as well, such as clock or calendar-based triggers (e.g. start a tree every Monday, etc.).

First Level Descended Document Handling

As previously described, when a message is received, it can be easily be determined by extracting and analyzing the values of the GUID metadata that the message is an original message (e.g. starting a new tree of discussion) because the SelfGUID and Origin GUID values are equal, or because all three GUID values are equal.

When (45) a recipient decides to forward an original document, or to reply to an original document, the document handling client is configured to automatically associate the following GUID values in the metadata for the reply document or forwarded document:
  (a) the OriginGUID of the reply or forward document is set (46) to the same value as the OriginGUID of the received original document;
  (b) the ParentGUID of the reply or forward document is set (46) to null;
  (c) the SelfGUID of the reply or forward document is set (47) to a new and unique value; and
  (d) analysis is performed (44) on the historical participation and contribution of a set of potential recipients, and proposed recipient lists (e.g. TO, CC, and BC lists) are generated for the user's review, acceptance, or modification.

As such, record of the immediate predecessor (e.g. parent) document's GUID is maintained. A document such as this is just one level descended from the original document, a condition which can be detected by a recipient by the fact that the document's ParentGUID is null. Thus, it can be determined that this document is a first reply or a first forwarding of an original document, belonging to the first level descended from the top of the conversation tree.

Second and $N^{th}$ Level Descended Document Handling

When a first level document is received by a document handling client, the genealogical metadata is extracted and stored in the client's local datastore. The document handling client can determine from the extracted metadata that the received document is a first-level descended document because the document's GUID's do not represent three different values.

Subsequently, when (48) the user of that particular client program composes a reply to a first-level descended document, or forwards a first-level descended document, the genealogical metadata for the message is defined as follows:
  (a) OriginGUID is set (49) to equal the OriginGUID of the predecessor document, thereby maintaining a record of the origin document for the tree in which the new message belongs;
  (b) The ParentGUID is set (400) to the SelfGUID value of the received document, thereby indicating that the new reply or forward document is descended from the original document by at least two levels;
  (c) the SelfGUID of the reply or forward document is set (47) to a new and unique value; and (d) analysis is performed (44) on the historical participation and contribution of a set of potential recipients, and proposed recipient lists (e.g. TO, CC, and BC lists) are generated for the user's review, acceptance, or modification.

In this state, the metadata values for OriginGUID, ParentGUID and SelfGUID are three unique and unequal values, which indicates this document belongs somewhere within the tree beyond the first-level below the top of the tree.

The same process is followed for subsequent documents, always maintaining the OriginGUID value as the previous document's OriginGUID value, shifting the SelfGUID value of the previous document to the ParentGUID of the new document, and generating a new value for SelfGUID for the new document, for any number N of levels into the tree.

Historical Analysis of Author and Recipient Contributions and Participation

As each document handling client device or system receives and sends documents, it extracts and locally stores the genealogical metadata, thereby accumulating information which is useful for determining the historical participation of each recipient and author of original documents, reply documents, and forwarded documents.

Because the OriginGUID uniquely indicates membership to a conversation tree, all of the records having the same OriginGUID value can be analyzed to determine the following information:
  (a) which recipients have received one or more documents in the tree;
  (b) which recipients have replied to one or more documents in the tree;
  (c) which recipients have forwarded one or more documents in the tree; and
  (d) which recipients have never forwarded or replied to a document in the tree.

This analysis can be restricted to analysis of "branches" of a tree based upon the ParentGUID values equally well. By combining the analysis with other factors such as document counts, date values and time values, additional information can be determined including, but not limited to:
  (e) the total number of documents from all recipients in a tree or branch of conversation (original document+all replies+all forwards);
  (f) the total number of recipients and participants of documents in a tree or branch;
  (g) the typical or average time between posting documents (e.g. a pace of conversation);
  (h) the typical or average number of documents contributed by participants in the tree or branch (e.g. total number of documents divided by total number of participants).

Additionally, each individual participant's contributions can be analyzed to determine their participation characteristics, such as:
  (i) the total number of documents (replies and forwards) contributed by a given participant, if any;
  (j) the length of time since a given participant contributed to a tree or branch of conversation;
  (k) whether or not a given participant has contributed an average number of documents to a tree or branch of conversation; and
  (l) whether or not a given participant has contributed at an average pace to the conversation.

Classification and Proposing of Recipient Lists

Figure 5:
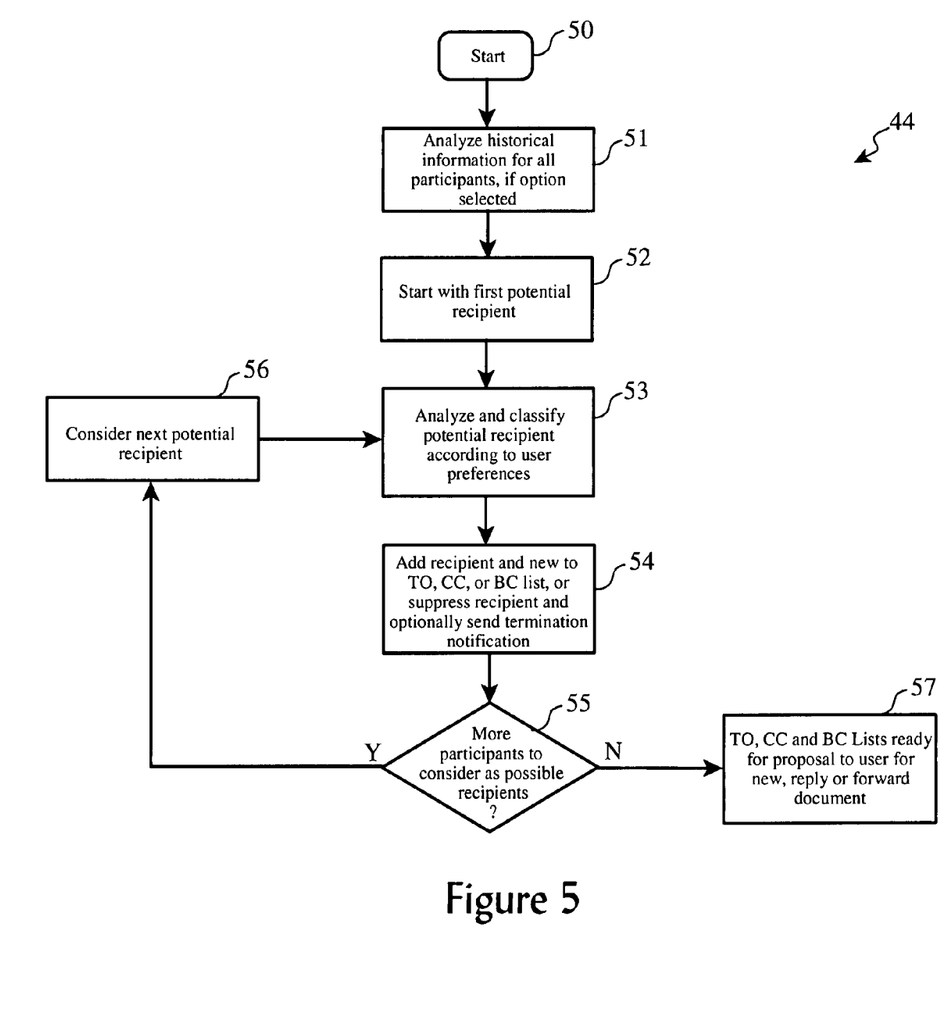
FIG. 5 depicts our logical process for analyzing the historical participation of potential recipients and proposing TO, CC and BC lists for a reply or forward message.

Turning to FIG. 5, according to the present invention, when a user is ready to author a new message, a reply message, or forward a message, the invention automatically performs analysis of the locally-stored genealogical meta and proposes lists for the TO, CC and BC fields of the new message, reply message, or message to be forwarded.

The process starts (50) by analyzing (52) the historical data for the entire group of participants (e.g. all recipients and all authors), if the user preferences require comparison to any group-wide metrics such as average number of documents contributed by each participant, average time between contributions, etc.

Then, beginning with a first potential recipient to a last potential recipient (53, 55, 56), each potential recipient's historical contribution is analyzed according to the user's preferences and thresholds, and classified (53) as to his or her activity level:
  (1) active participants whose contributions historically met or exceeded criteria and pattern characteristics set by user thresholds and preferences;
  (b) declared inactive participants who are listed currently in a passive addressing list such as a "CC", "monitor", "read only" or "observer" list; and
  (c) historically inactive participants whose contributions historically have not met criteria and pattern characteristics set by user thresholds and preferences, including participants who where originally designated as active members (e.g. were originally on the TO list) but who have not contributed to the information flow (e.g. have not replied to the documents).

According to the user's preferences, each potential recipient is either added to a recipient list (e.g. the TO, CC or BC list), or suppressed from receipt of the document (55). Optionally, for those participants who are suppressed from receipt of the document, a special notice of termination or elimination from the active members of the conversation may be transmitted.

When all of the potential recipients have been properly considered, classified, and added to a recipient list (or suppressed), the TO, CC and BC lists are proposed (57) to the user for use in the new document, reply document or document to be forwarded.

Advanced Node-Based Flow Control

No thread tracking per se is required to realize the present invention, as every machine has a locally managed history which allows for determinations of active and inactive status to be made. The invention, therefore, realizes node-based flow control, without need for knowledge or tracking on a thread-basis of previous document or message sequences.

So, each Reply or Forward action is essentially a starting new "branch" in the tree, independent of historical thread, but considering historical participation. This fits the ad hoc nature of this type of communication, rather than the more formal "discussion group", "chat room" or mailing list schemes.

The following application programming interface ("API") calls are provided to an email system in our preferred embodiment:
  (a) ListOfParticipant getTreeActives (GUID)—Gets the list of participants that have either forwarded or authored additional content in a document tree.
  (b) ListOfParticipant getTreePassives (GUID)—Gets the list of participants that have not either forwarded or authored additional documents in a document tree.
  (c) GUID getOrigin (GUID)—Gets the GUID of the original email that started the tree indicated by the GUID parameter.
  (d) ListofParticipant getTreeBCCed (GUID)—Gets the list of participants that have been blind copied on a document tree.

(e) ListofParticipant getTreeCCed (GUID)—Gets the list of participants that have been directly addressed on a document tree.

(f) ListOfParticipant getTreeTOed (GUID)—Gets the list of participants that have been directly addressed on a document tree.

(g) ListOfParticipant getTreeEveryone(GUID)—Gets the list of every addressee at every level for the branch, and so on.

Provided this type of participation history information, higher-level functions are defined to propagate new, reply and forwarded documents according to participation levels in more intelligent manners. Some examples include:

(i) ReplyEveryOneNarrow—reply to all participants on the same branch of the document tree.

(ii) ReplyEveryOne Wide—reply to all (locally known) participants on the entire tree.

(iii) ReplyActive MembersOnlyNarrow—reply to all active participants on the same branch of the document tree.

(iv) ReplyPassiveMembersOnlyNarrow—reply to all passive participants on the same branch of the document tree.

(v) ReplyPassiveMembersOnlyWide—reply to all passive participants on the entire document tree.

(vi) ReplyWithNewContext—reply to document. Generates a new email has no "history" (e.g. new GUID values are generated as described with respect to generating a top-of-tree document).

(vii) ForwardWithNew Context—forward a document with no "history" (e.g. GUID values are generated as described with respect to generating a top-of-tree document).

Even more advanced flow control functions are possible, such as replying to active members while also sending an email termination notification to passive members of the tree to inform them of their removal from future participation, unless they actively respond, in which case, they would be moved from passive to active.

Advanced Participation Analysis

Participation analysis (e.g. determining who is "active" and who is "inactive") can be performed on relatively simple criteria and patterns, or may be as sophisticated as warranted by the application of the invention, including but not limited to:

(a) simple time-based threshold which declares a participant as "inactive" if he or she has not contributed to the flow of information with a past period of time which is configurable by the user;

(b) a simple document count threshold which declares a participant as "inactive" if he or she has not contributed to the flow of information with a past number of documents exchanged which is configurable by the user;

(c) a "top contributors" threshold which uses a sorted histogram to remove contributors who do not contribute a majority of the information (e.g minor contributors or occasional contributors); and (d) a "conversation pace" threshold which combines historical time-based contributions with number of contributions.

With respect to a simple time-based threshold, a user may set a preference which says that any participant (e.g. any candidate recipient of the reply or forward message) who has not authored or sent a message in the last X minutes, hours, days, weeks, months, etc., should be declared "inactive". For example, a user may consider that any member who has not contributed to the flow of information within the last week is not current with the discussion, and therefore is not an "active" participant in the discussion.

With respect to a simple message count threshold, a user may set a preference which says that any participant (e.g. any candidate recipient of the reply or forward message) who has not sent a document in the last X number of documents should be declared "inactive". For example, a user may consider 50 documents to be the most recent "context" of discussion, and any member which has not responded or contributed a document within the last 50 documents is not "actively" involved.

With respect to the "top contributors" analysis, only those participants who are most involved are maintained as active, dropping the participants who sporadically or occasionally contribute from the distribution and document flow. First, according to preferences set by a user, the count of documents contributed by each participant for a specified period of time would be made. Then, these would be sorted into rank order of most documents to least. Finally, those members who are not in the top N contributors (simple selection of a set number of members), or those who did not contribute above a certain specified threshold, are considered inactive.

For example, consider a 20-member distribution list, including a current recipient, a current author (e.g. the "FROM" participant), and 18 co-recipients. Assume that over the last month, the current recipient has received a total of 242 documents from these other 19 members. By rank ordering these 19 members according to number of documents they each contributed during the past month, the user or current recipient may choose to address his or her reply only to the top 7 contributors, thereby eliminating 12 members from the distribution list. Or, the current recipient may choose to address his or her reply only to the recipients who have contributed the average number of documents (e.g. 242/19=12.7 documents) or more during the last month.

In another type of analysis, a "pace" of the conversation may be determined to minimize removing of participants from discussions if the discussion is proceeding slower than normal. Some conversations get attention once every few days (e.g. medical research analysis), while others are more actively pursued with documents being exchanged every few minutes (e.g. stock trading news and discussions). So, an analysis of the "rate" of exchange of documents for a group of participants may be determined, and a threshold set relative to that rate above which members are considered "active".

For example, consider a document which is received with eight co-recipients designated in the TO list, with the author being the ninth "group" member, and the current recipient being the tenth member. The pace of contributions for this group can be determined over a past period by counting the number of documents received by all of the group members (e.g. by the 10 members) during the period (e.g. during the last month), and dividing by the period and member count to obtain a documents-per-time-per-member pace value (e.g. documents-per-month-per-participant). Then, the contribution rate for each individual member can be determined (e.g. dividing the total number of documents from a member by the period), and compared to a threshold value. If the member's contribution level is below the threshold (e.g. compares unfavorable to the average rate of contribution), then the member is considered "inactive".

For our present example, assume that the period of analysis is one month, and that the total number of documents from all 10 members has been 143 documents. This would yield a "pace" of 14.3 documents per member per month. If the threshold is set to be 40%, then any member who has not contributed at least 5 documents in the last month (e.g. 0.4*14.3 rounded) would be declared inactive.

According to one aspect of the preferred embodiment, the historical analysis is extendable through the use of DLLs, plug ins, or user-configurable rules or programming language (e.g. scripts) to allow adaptation and adjustment of the system to the specific needs of each user.

Additionally, "upper limits" of contribution may also be set to remove certain types of participants from the distribution lists. In some situations, there may be a member of the distribution list who responds to each and every document, without reserve or real contribution to be made. They often are referred to as "flame mailers" in an email context. Historically, these members would contribute an inordinately high percentage of documents compared to the total group of recipients, and may also exhibit overly quick responses. As such, the analysis may be adjusted to declare members who respond to often or too quickly as "inactive" as a means for automatically eliminating them from the flow.

Suitable Computing Platforms

The present invention is optionally realized as one or more software programs disposed in computer readable media of an appropriate computing platform equipped also with a document handling application program. The computing platform may be a PC, PDA, web-enabled wireless telephone, or any other suitable system which is capable of asynchronous document exchange as previously discussed. The document handling product may be a typical email software application program such as Lotus Notes™, icrosoft™ Outlook or Netscape Communicator, a document conferencing program such as Lotus WordPro™ or Microsoft™ Word, or a proprietary document handling program.

The associated document handling product preferably includes an address book function, but if not, such a function may be added by the present invention. As such, a system such as that shown in FIG. 2 may be modified and enhanced to realize the present invention with the incorporation the previously-described processes.

Many methods of incorporation of the processes of the invention to the common document handling platforms are available, from "inline" modifications of the existing software application programs or operating systems, to provision of independent "stand alone" application programs which cooperate with the common messaging software, to extension of the exiting software using "plug ins" or Dynamic Link Library modules.

Figure 6:
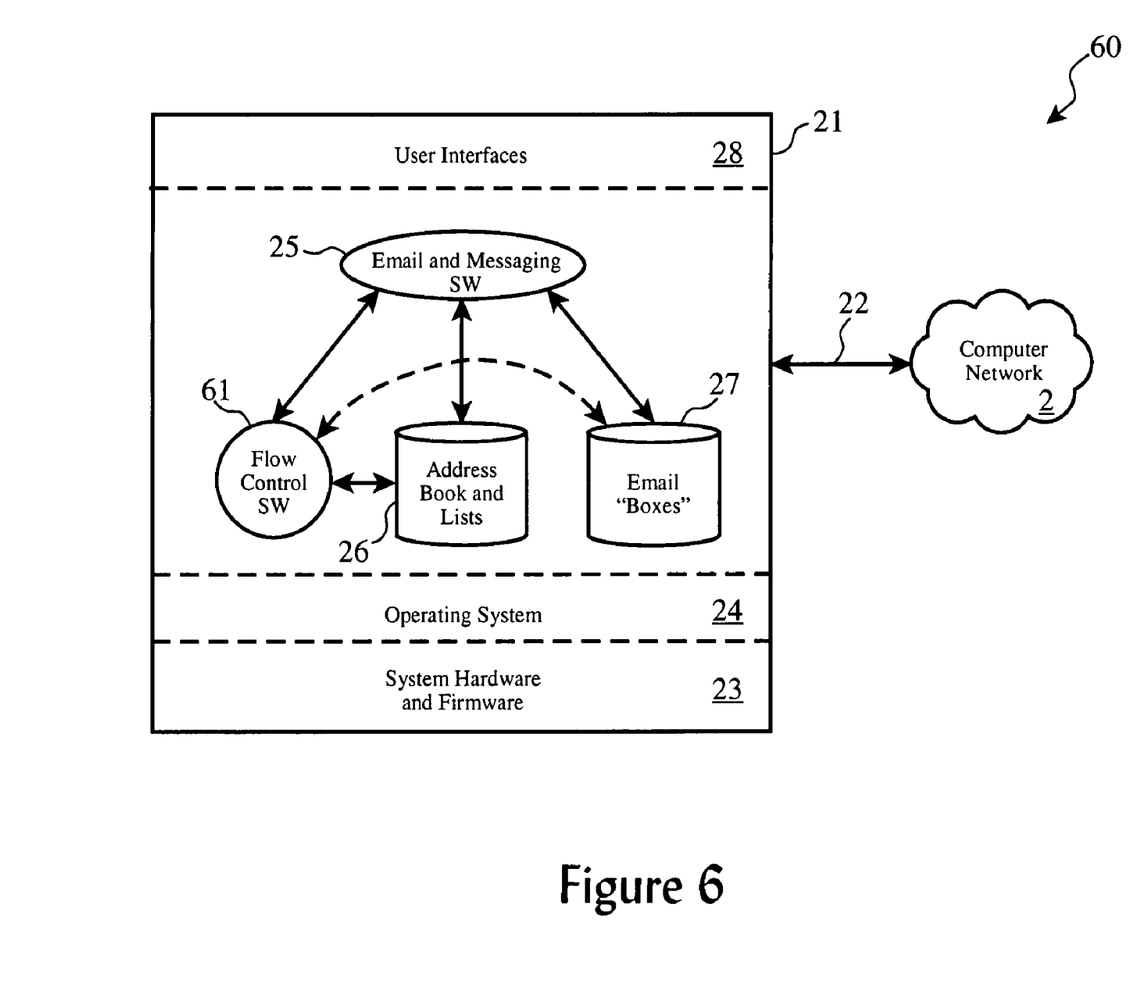
FIG. 6 shows one potential embodiment of the present invention incorporated to a messaging system such as that shown in FIG. 2.

FIG. 6 shows such an enhanced messaging client system (60), including our flow control processes (61) of the present invention for extracting and generating genealogical GUID metadata, and for analyzing historical participation of recipients and authors of messages, as previously described.

System Architecture

Figure 7:
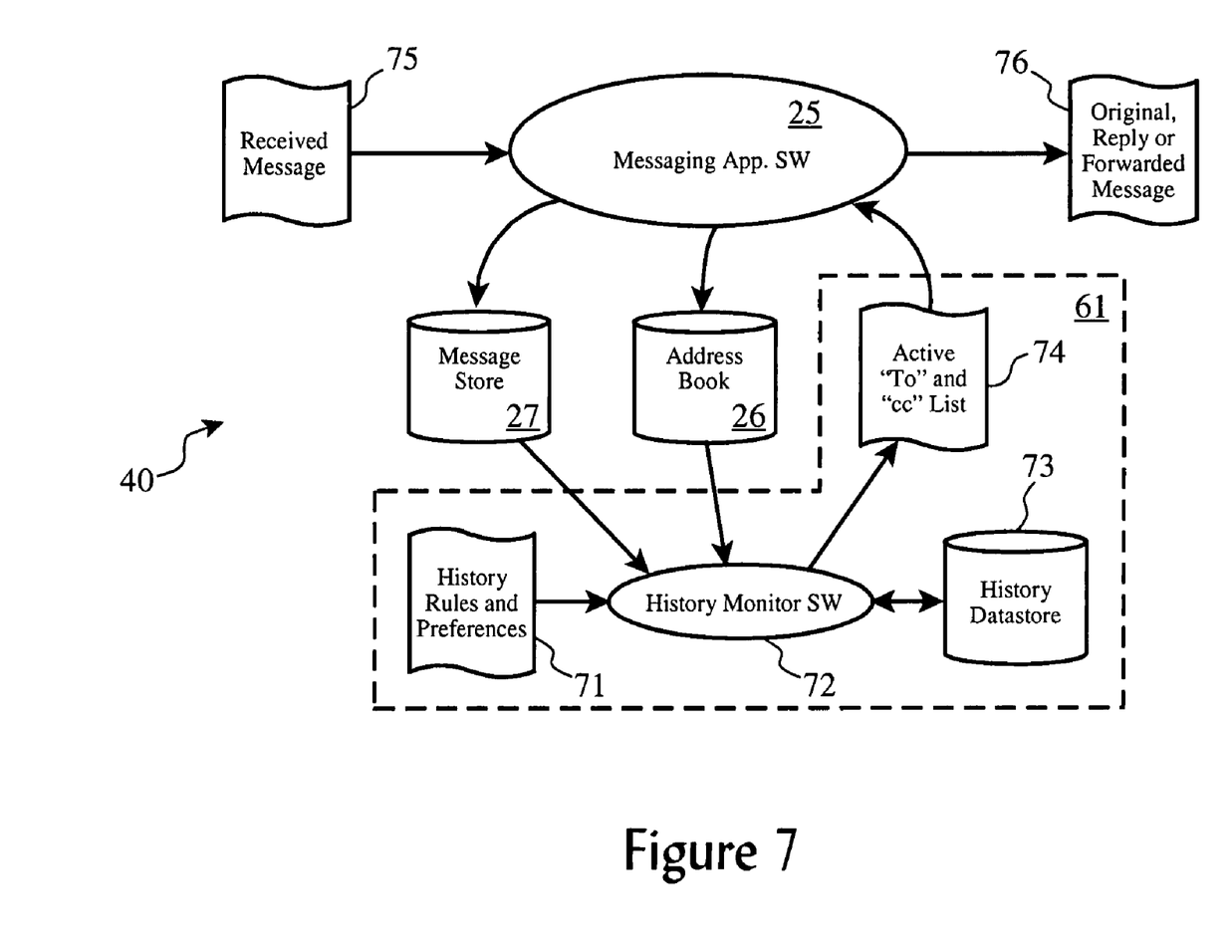
FIG. 7 provides an architectural illustration of the present invention.

FIG. 7 provides details of the architecture of our preferred embodiment as applied to an electronic mail system. In this embodiment, each original email message, reply email message, and forwarded email message is considered a separate document, receiving a unique SelfGUID for each message.

The flow control software or subsystem (61) includes a set of history rules, analysis processes, and user preferences (71), which are used by a history monitor process (72). A history datastore (73) is also preferably provided in order to persistently store extracted message genealogical meta data.

During operation, the history monitor (72) accesses the system's message store (27) to extract message GUID meta data from each received message (75), and to store that information in the local history datastore (73).

When an original message, reply message or forwarded message (76) is being created by the user of the messaging application software (25), the history monitor (72) provides the application software (25) with one or more functions to analyze the historical contributions of each potential recipient using the history datastore (73), and the propose TO, CC and BC lists (74) accordingly.

CONCLUSION

The present invention has been disclosed using several example embodiments, with reference to options and variations to the embodiments. It will be readily recognized by those skilled in the art that these embodiments do not necessarily represent the full scope of the invention, and that certain variations and substitutions such as adoption of alternate programming methodologies, computing platforms, communications protocols, and messaging formats, can be made without departing from the spirit and scope of the invention. Therefore, the scope of the present invention should be determined by the following claims.

What is claimed is:

1. A method for controlling the flow of exchanged electronic documents comprising the steps of:
   receiving an electronic document by a recipient, said document being part of a set of documents which are inter-related through a non-thread historical tree structure;
   extracting and storing a plurality of unique identifier values guaranteed to be unique within a messaging network (GUID) associated with said document including a GUID for the document itself (SelfGUID), a GUID indicating a original predecessor document (OriginGUID) to which said received document is related, and a GUID indicating an immediate predecessor parent document (ParentGUID) to said received document;
   accumulating GUID values for a plurality of additional messages which are part of said non-thread historical tree structure;
   responsive to a user composing a new document related to said received document performing historical participation analysis of said non-thread historical tree structure using said stored GUID values according to a set of user preferences to classify one or more potential recipients; and
   proposing at least one list of recipients of said new document according to said potential recipient classifications.

2. The method as set forth in claim 1 wherein said step of extracting a plurality of GUID values from a received message comprises extracting a set of meta data values.

3. The method as set forth in claim 1 wherein said step of proposing a list of recipients comprises a step selected from the group of proposing a "To" list of addressees, proposing a "Carbon Copy" list of addressees, and proposing a "Blind Copy" list addressees.

4. The method as set forth in claim 1 wherein said step of performing historical participating analysis comprises performing an analysis selected from the group of:
   (a) designating a potential recipient as inactive if said participant has not contributed a document within a specified period of time;
   (b) designating a potential recipient as inactive if said potential recipient has not contributed a document within a specified recent number of messages;
   (c) designating a potential recipient as inactive if said potential recipient does not belong to a top portion of a group of potential recipients when rank ordered by number of documents contributed within a specified period of time;

(d) designating a potential recipient as inactive if said participant has not contributed a specified threshold number of documents within a specified time period; and (e) designating a potential recipient as inactive if said participant has not contributed documents at a rate favorably comparable to an determined pace for an entire group of potential recipients.

5. The method as set forth in claim 1 further comprising sending a notice to recipients who have been classified as inactive participants.

6. The method as set forth in claim 1 wherein said step of composing a new document comprises composing a reply message.

7. The method as set forth in claim 1 wherein said step of composing a new document comprises composing a forwarded message.

8. The method as set forth in claim 1 wherein said step of proposing at least one list of recipients comprises a step selected from the group of:

(a) replying to all document contributors and document recipients within a current branch of a conversation tree;

(b) replying to document contributors and document recipients within an entire conversation tree;

(c) replying to document contributors and document recipients classified as "active participants" within a current branch of a conversation tree;

(d) replying only to document contributors and document recipients as "passive participants" within a current branch of a conversation tree;

(e) replying only to document contributors and document recipients classified as "passive participants" within an entire tree of conversation;

(f) forwarding to all document contributors and document recipients within a current branch of a conversation tree;

(g) forwarding to all document contributors and document recipients within an entire conversation tree;

(i) forwarding only to document contributors and document recipients classified as "active participants" within a current branch of a conversation tree;

(j) forwarding only to document contributors and document recipients classified as "passive participants" within a current branch of a conversation tree; and (k) forwarding only to document contributors and document recipients classified as "passive participants" within an entire tree of conversation.

9. The method as set forth in claim 1 further comprising the steps of:

associating an OriginGUID value with said new document having a value equal to the OriginGUID value of said received document;

associating a ParentGUID value with said new document having a value equal to the SelfGUID of said received document; and associating a new and unique SelfGUID value with said new document.

10. The method as set forth in claim 1 further comprising composing a new document with new context by performing the steps of:

associating a null OriginGUID value and null ParentGUID value with said new document; and associating a new and unique SelfGUID value with said new document.

11. An article of manufacture for controlling the flow of exchanged documents comprising:

a computer readable medium suitable for encoding software programs;

one or more software programs encoded by said medium and configured to cause a processor to perform steps including:

(a) receiving an document by a recipient, said document being part of a set of documents which are interrelated through a non-thread historical tree structure;

(b) extracting and storing a plurality of unique identifier values guaranteed to be unique within a messaging network (GUID) associated with said document including a GUID for the document itself (SelfGUID), a GUID indicating a original predecessor document (OriginGUID) to which said received document is related, and a GUID indicating an immediate predecessor parent document (ParentGUID) to said received document;

(c) accumulating GUID values for a plurality of additional messages which are part of said non-thread historical tree structure;

(d) responsive to a user composing a new document related to said received document performing historical participation analysis of said non-thread historical tree structure using said stored GUID values according to a set of user preferences to classify one or more potential recipients; and (e) proposing at least one list of recipients of said new document according to said potential recipient classifications.

12. The article as set forth in claim 11 wherein said software for extracting a plurality of GUID values from a received message comprises software for extracting a set of meta data values.

13. The article as set forth in claim 11 wherein said software for proposing a list of recipients comprises software for performing a step selected from the group of proposing a "To" list of addressees, proposing a "Carbon Copy" list of addressees, and proposing a "Blind Copy" list addressees.

14. The article as set forth in claim 11 wherein said software for performing historical participating analysis comprises software for performing an analysis selected from the group of:

(a) designating a potential recipient as inactive if said participant has not contributed a document within a specified period of time;

(b) designating a potential recipient as inactive if said potential recipient has not contributed a document within a specified recent number of messages;

(c) designating a potential recipient as inactive if said potential recipient does not belong to a top portion of a group of potential recipients when rank ordered by number of documents contributed within a specified period of time;

(d) designating a potential recipient as inactive if said participant has not contributed a specified threshold number of documents within a specified time period; and (e) designating a potential recipient as inactive if said participant has not contributed documents at a rate favorably comparable to an determined pace for an entire group of potential recipients.

15. The article set forth in claim 11 wherein said software for sending a notice to recipients who have been classified as inactive participants.

16. The article as set forth in claim 11 wherein said software for composing a new document comprises software for composing a reply message.

17. The article as set forth in claim 11 wherein said software for composing a new document comprises software for composing a forwarded message.

18. The article as set forth in claim 11 wherein said software for proposing at least one list of recipients comprises software for performing a step selected from the group of:
(a) replying to all document contributors and document recipients within a current branch of a conversation tree;
(b) replying to document contributors and document recipients within an entire conversation tree;
(c) replying to document contributors and document recipients classified as "active participants" within a current branch of a conversation tree;
(d) replying only to document contributors and document recipients as "passive participants" within a current branch of a conversation tree;
(e) replying only to document contributors and document recipients classified as "passive participants" within an entire tree of conversation;
(f) forwarding to all document contributors and document recipients within a current branch of a conversation tree;
(g) forwarding to all document contributors and document recipients within an entire conversation tree;
(i) forwarding only to document contributors and document recipients classified as "active participants" within a current branch of a conversation tree;
(j) forwarding only to document contributors and document recipients classified as "passive participants" within a current branch of a conversation tree; and
(k) forwarding only to document contributors and document recipients classified as "passive participants" within an entire tree of conversation.

19. The article as set forth in claim 11 wherein said software further performs the steps of:
associating an OriginGUID value with said new document having a value equal to the OriginGUID value of said received document;
associating a ParentGUID value with said new document having a value equal to the SelfGUID of said received document; and
associating a new and unique SelfGUID value with said new document.

20. The article as set forth in claim 11 wherein said software for composing a new document with new context by performing the steps of:
associating a null OriginGUID value and null ParentGUID value with said new document; and
associating a new and unique SelfGUID value with said new document.

21. A system for controlling the flow of exchanged documents comprising:
a first electronic document having a plurality of associated Globally Unique Identifier (GUID) values including a GUID for the document itself (SelfGUID), a GUID indicating a original predecessor document (OriginGUID) to which said received document is related, and a GUID indicating an immediate predecessor parent document (ParentGUID) to said received document, said document being part of a set of documents which are interrelated through a non-thread historical tree structure, said GUID values being guaranteed unique within a messaging network;
a GUID extractor a configured to extract and store said first document GUID values, and to accumulate GUID values for a plurality of additional messages which are part of said non-thread historical tree structure;
an historical participation analyzer cooperative with a new document composer configured to, responsive to composing a new document related to said non-thread historical tree structure, analyze said stored GUID values and to classify one or more potential recipients according to a set of user preferences; and
a recipient list generator configured to propose at least one list of recipients of said new document according to said potential recipient classifications.

22. The system as set forth in claim 21 wherein said GUID extractor is further configured to extract a set of meta data values.

23. The system as set forth in claim 21 wherein said recipient list generator is further configured to propose a list selected from the group of a "To" list of addressees, a "Carbon Copy" list of addressees, and a "Blind Copy" list addressees.

24. The system as set forth in claim 21 wherein said historical participating analyzer is further configured to perform an analysis selected from the group of:
(a) designating a potential recipient as inactive if said participant has not contributed a document within a specified period of time;
(b) designating a potential recipient as inactive if said potential recipient has not contributed a document within a specified recent number of messages;
(c) designating a potential recipient as inactive if said potential recipient does not belong to a top portion of a group of potential recipients when rank ordered by number of documents contributed within a specified period of time;
(d) designating a potential recipient as inactive if said participant has not contributed a specified threshold number of documents within a specified time period; and
(e) designating a potential recipient as inactive if said participant has not contributed documents at a rate favorably comparable to an determined pace for an entire group of potential recipients.

25. The system as set forth in claim 21 further comprising a termination notice sender for sending notification to recipients who have been classified as inactive participants.

26. The system as set forth in claim 21 wherein said new document composer is further configured to compose a reply message.

27. The system as set forth in claim 21 wherein said new document composer is further configured to compose a forward message.

28. The system as set forth in claim 21 wherein said recipient list generator is adapted to propose a list to a set of recipients selected from the group of:
(a) all document contributors and document recipients within a current branch of a conversation tree;
(b) all document contributors and document recipients within an entire conversation tree;
(c) all document contributors and document recipients classified as "active participants" within a current branch of a conversation tree;
(d) only document contributors and document recipients as "passive participants" within a current branch of a conversation tree; and,
(e) only document contributors and document recipients classified as "passive participants" within an entire tree of conversation.

29. The system as set forth in claim 21 further comprising:
an OriginGUID value associated with said new document having a value equal to the OriginGUID value of said first document;

a ParentGUID value associated with said new document having a value equal to the SelfGUID of said first document; and a new and unique SelfGUID value associated with said new document.

30. The system as set forth in claim 21 in which said new document is provided a new context including:

a null OriginGUID value and a null ParentGUID value associated with said new document; and a new and unique SelfGUID value associated with associated with said new document.

* * * * *